(12) United States Patent
Frank et al.

(10) Patent No.: US 7,569,303 B2
(45) Date of Patent: Aug. 4, 2009

(54) MEMBRANE ELECTRODE ASSEMBLY WITH MODIFIED CATALYST LAYOUT

(75) Inventors: David Frank, Scarborough (CA); Nathaniel Ian Joos, Toronto (CA); Mario Dzamarija, Toronto (CA); Raymond Candido, Toronto (CA); Rami Michel Abouatallah, Toronto (CA)

(73) Assignee: Hydrogenics Corporation, Mississauga, ON (CA)

( * ) Notice: Subject to any disclaimer, the term of this patent is extended or adjusted under 35 U.S.C. 154(b) by 886 days.

(21) Appl. No.: 10/948,327

(22) Filed: Sep. 24, 2004

(65) Prior Publication Data

US 2006/0068267 A1    Mar. 30, 2006

(51) Int. Cl.
*H01M 4/00* (2006.01)
*H01M 2/00* (2006.01)
*H01M 2/08* (2006.01)

(52) U.S. Cl. ............................. 429/40; 429/34; 429/35; 429/44

(58) Field of Classification Search .................. 429/40, 429/34, 35, 44
See application file for complete search history.

(56) References Cited

U.S. PATENT DOCUMENTS

| | | | |
|---|---|---|---|
| 4,755,439 A * | 7/1988 | Trocciola et al. | ............... 429/22 |
| 5,176,966 A | 1/1993 | Epp et al. | |
| 5,419,980 A | 5/1995 | Okamoto et al. | |
| 5,578,388 A | 11/1996 | Faita et al. | |
| 6,057,054 A | 5/2000 | Barton et al. | |
| 6,602,632 B2 | 8/2003 | Wakahoi et al. | |
| 6,716,550 B1 | 4/2004 | Kirby | |
| 2002/0122970 A1 | 9/2002 | Inoue et al. | |
| 2003/0031914 A1 | 2/2003 | Frank et al. | |
| 2003/0049518 A1* | 3/2003 | Nanaumi et al. | ............... 429/44 |
| 2006/0035133 A1* | 2/2006 | Rock et al. | ..................... 429/35 |

FOREIGN PATENT DOCUMENTS

| | | |
|---|---|---|
| CA | 2422926 | 3/2003 |
| EP | 1 083 616 A2 | 3/2001 |
| EP | 1 107 340 A2 | 6/2001 |
| EP | 1 156 546 A1 | 11/2001 |
| EP | 1 070 361 B1 | 10/2002 |
| JP | 2001-0338673 | 7/2001 |
| WO | WO 00/24066 | 4/2000 |

* cited by examiner

*Primary Examiner*—Dah-Wei D Yuan
*Assistant Examiner*—Zachary Best
(74) *Attorney, Agent, or Firm*—H. Samuel Frost; Bereskin & Parr LLP/S.E.N.C.R.L., s.r.l.

(57) ABSTRACT

An electrochemical cell assembly includes first and second flow field plates, first and second gas diffusion media disposed between the first and second flow field plates, and a membrane electrode assembly disposed between the first and second gas diffusion media. The membrane electrode assembly can include a proton exchange membrane, and a catalyst layer on the proton exchange membrane. The catalyst layout can be configured to omit the catalyst layer from a portion of the proton exchange membrane adjacent an edge region of one of the first and second gas diffusion media, thereby enabling at least a portion of the reactant fluid flow to first encounter a region of the membrane electrode assembly without the catalyst layer. The modified catalyst layout can improve reactant fluid flow along the membrane electrode assembly, reduce wear on the membrane electrode assembly and improve electrochemical cell efficiency during operation.

16 Claims, 10 Drawing Sheets

MEMBRANE ELECTRODE ASSEMBLY WITH MODIFIED CATALYST LAYOUT

FIELD OF THE INVENTION

This invention relates to electrochemical cells such as fuel cells and electrolyzer cells. In particular, this invention relates to modifications of the membrane electrode assembly used in electrochemical cells.

BACKGROUND OF THE INVENTION

Electrochemical cells are energy conversion devices that include fuel cells and electrolyzer cells. Fuel cells are used to generate electrical energy using various fuels, whilst electrolyzer cells are used to generate hydrogen gas from hydrogen-containing fluids.

A typical solid polymer water electrolyzer (SPWE) or proton exchange membrane (PEM) electrolyzer includes an anode, a cathode and a PEM disposed between the two electrodes. The PEM is a selective electrolytic membrane with a catalyst layer on each side. An electrolyzer uses electricity to electrolyze water to generate oxygen from its anode and hydrogen from its cathode. Water is introduced to, for example, the anode of the electrolyzer which is connected to the positive pole of a suitable direct current voltage. Oxygen is produced at the anode by a reaction according to the equation $H_2O = \frac{1}{2}O_2 + 2H^+ + 2e^-$. The protons then migrate from the anode to the cathode through the membrane. On the cathode, which is connected to a negative pole of the direct current voltage, the protons that are conducted through the PEM are reduced to hydrogen according to the equation $2H^+ + 2e^- = H_2$.

A conventional PEM fuel cell includes an anode, and a cathode with the PEM disposed between the anode and cathode. A fuel cell generates electricity by bringing a fuel gas (typically hydrogen) and an oxidant gas (typically oxygen) to the anode and the cathode respectively. In reaction, the fuel is oxidized at the anode to form cations (protons) and electrons according to the equation: $H_2 = 2H^+ + 2e^-$. The PEM facilitates the migration of protons from the anode to the cathode while preventing the electrons from passing therethrough. As a result, the electrons are forced to flow through an external circuit thus providing an electrical current. At the cathode, oxygen reacts with electrons returned from the electrical circuit to form anions. The anions formed at the cathode react with the protons that have crossed the membrane to form liquid water as the reaction by-product according to the equation: $\frac{1}{2}O_2 + 2H^+ + 2e^- = H_2O$.

More particularly, a typical fuel cell employing a PEM comprises an anode flow field plate, a cathode flow field plate, and a membrane electrode assembly (MEA) disposed between the anode and the cathode flow field plates. Each reactant flow field plate has an inlet region, an outlet region, and open-faced channels to fluidly connect the inlet to the outlet, and provide a way for distributing reactant gases to the outer surfaces of the MEA. Achieving good performance with a fuel cell requires that the reactant gases are evenly distributed over the entire surface of the active area of the respective flow field plates. This is achieved through the use of a flow control structure known as a flow field on the active surfaces of the flow field plates. The flow field plates are fabricated from conductive materials and the flow fields typically include a pattern of grooves and lands.

The MEA comprises the PEM disposed between an anode catalyst layer and a cathode catalyst layer. The PEM may be a suitable proton conducting material such as an ionomer and the like. The catalyst layers include electrocatalysts such as platinum supported on fine carbon which provides sufficient electrical conduction for electrons. The MEAs are also properly supported in the electrochemical cell when assembled to prevent the leakage of process fluids.

A first gas diffusion media (GDM) is disposed between the anode catalyst layer and the anode flow field plate, and a second GDM is disposed between the cathode catalyst layer and the cathode flow field plate. The GDMs facilitate the diffusion of the reactant gas, either the fuel or the oxidant, to the catalyst surfaces of the MEA. Furthermore, the GDMs enhance the electrical conductivity between each of the anode and cathode flow field plates and the electrodes.

Conventional fuel cells generate relatively low voltages. In order to provide a useable amount of power, fuel cells are commonly configured into fuel cell stacks, which typically may have 10, 20, 30 or even hundreds of fuel cells in a single stack. While this does provide a single unit capable of generating useful amounts of power at usable voltages, the design can be quite complex and can include numerous elements, all of which must be carefully assembled.

This basic cell structure itself requires two seals, each seal being provided between one of the flow field plates and the PEM. Moreover, these seals have to be of a relatively complex configuration. In particular, as detailed below, the flow field plates, for use in a fuel cell stack, have to provide a number of functions and a complex sealing arrangement is required.

For a fuel cell stack, the flow field plates typically provide apertures or openings at either end, so that a stack of flow field plates then define elongate channels extending perpendicularly to the flow field plates to form distribution channels extending through the entire fuel cell stack. As a fuel cell requires flows of a fuel, an oxidant and a coolant, this typically requires three pairs of ports or six ports in total for a fuel cell with three ports for each side of the flow field plates. This is because it is necessary for the fuel and the oxidant to flow through each fuel cell. However, it is possible to have multiple inlets and outlets to the fuel cell for each fluid depending on the stack/cell design. Any combination can be envisioned as long as there is a continuous flow through the fuel cell to ensure that, while most of the fuel or oxidant (as the case may be) is consumed, any contaminants are continually flushed through the fuel cell. It will thus be appreciated that the sealing requirements may be complex.

The coolant commonly flows across the back of each fuel cell, so as to flow between adjacent, individual fuel cells. This is not essential however and, as a result, many fuel cell stack designs have cooling channels only at every 2nd, 3rd or 4th (etc.) plate. This allows for a more compact stack (thinner plates) but may provide less than satisfactory cooling. This provides the requirement for another seal, namely a seal between each adjacent pair of individual fuel cells.

The foregoing assumes that the fuel cell is a compact type of configuration provided with water or the like as a coolant. There are known stack configurations, which use air as a coolant, either relying on natural convection or by forced convection. Such cell stacks typically provide open channels through the stacks for the coolant, and the sealing requirements are lessened. Commonly, it is then only necessary to provide sealed supply channels for the oxidant and the fuel.

Commonly, the seals are formed by providing channels or grooves in the flow field plates, and then providing prefabricated gaskets in these channels or grooves to effect a seal. In known manner, the gaskets (and/or seal materials) are specifically polymerized and formulated to resist degradation from contact with the various materials of construction in the fuel cell, various gasses and coolants which can be aqueous, organic and inorganic fluids used for heat transfer. Reference to a resilient seal here refers typically to a floppy gasket seal molded separately from the individual elements of the fuel cells by known methods such as injection, transfer or compression molding of elastomers. By known methods, such as insert injection molding, a resilient seal can be fabricated on a plate, and clearly assembly of the unit can then be simpler, but forming such a seal can be difficult and expensive due to inherent processing variables such as mold wear, tolerances in fabricated plates and material changes. In addition custom made tooling is required for each seal and plate design.

A fuel cell stack, after assembly, is commonly clamped to secure the elements and ensure that adequate compression is applied to the seals and active area of the fuel cell stack. This method ensures that the contact resistance is minimized and the electrical resistance of the cells is at a minimum. To this end, a fuel cell stack typically has two substantial end plates, which are configured to be sufficiently rigid so that their deflection under pressure is within acceptable tolerances. The fuel cell also typically has current bus bars to collect and concentrate the current from the fuel cell to a small pick up point and the current is then transferred to the load via conductors. Insulation plates may also be used to isolate, both thermally and electrically, the current bus bars and endplates from each other. A plurality of tension rods, bolts and the like are then provided so that the fuel cell stack can be clamped together. Rivets, straps, piano wire, metal plates and other mechanisms can also be used to clamp the stack together. To assemble the stack, the tension rods are provided extending through one of the plates, an insulator plate and then a bus bar (including seals) are placed on top of the endplate, and the individual elements of the fuel cell are then built up within the space defined by the rods or defined by some other positioning tool.

One problem with many electrochemical cell designs is the layout of the catalyst on the MEA. Commonly, the layout of the catalyst is such that the reactant gases or reactant fluids, provided by the inlet apertures in the anode or cathode flow field plates, directly impacts the catalyst when first introduced onto the MEA. At this point, the flow of the reactant gas is quite strong and turbulent and the reactant gases are at their highest concentrations in the vicinity of the inlet apertures. As a result, the catalyst in the vicinity of the inlet aperture of a given flow field plate tends to overreact with the reactant gas. The over-reaction at the catalyst in the vicinity of the inlet apertures produces a temperature increase in this area.

A similar problem occurs for the catalyst located in the vicinity of an outlet aperture for a given flow field plate. Typically, in a flow field plate, an inlet aperture feeds at least one main reactant gas flow channel which branches into a plurality of reactant gas flow channels to distribute the reactant gas flow across much of the flow field plate. The plurality of reactant gas flow channels then recombine into at least one main reactant gas channel which then feeds an outlet aperture. Since, the reactant gas flow channels are recombined near the outlet aperture, there is an increase in reactant gas flow. Accordingly, there is a tendency for the catalyst in the vicinity of the outlet aperture to over-react with the reactant gas. Similar problems of temperature increase, and gas flow turbulence result.

This additional heat may prematurely erode the membrane in those areas. In addition, the reactant gas travels through the plate in these areas, in a known backside feed manner, with the flow changing from the z plane to the x-y plane as the reactant gas flow through the inlet aperture and away from the inlet aperture to the membrane with the reverse occurring at the outlet apertures. This action may cause a lot of localized turbulence or pressure build-up, as well as higher reactant gas velocity, that may also damage the membrane. Typically the gases are coolest at the inlets and hottest at the outlets. This may also cause erosion of the membrane at the outlet apertures.

The temperature increase and the turbulent reactant gas flow also reduce the efficiency at which the fuel cell operates. Both the temperature increase and the turbulent gas flow also increase the rate of erosion of the catalyst located near the inlet and outlet apertures. Consequently, the lifetime of the MEA is reduced. This also results in an increase in the frequency at which the fuel cell stack undergoes maintenance. Further, the pressure is higher at the inlet apertures compared to the outlet apertures since some of the reactant gas diffuses across the GDM as the reactant gas flows across the face of the flow field plate from the inlet aperture to the outlet aperture. This added pressure may also affect the structural integrity of the membrane at the inlet apertures.

SUMMARY OF THE INVENTION

The inventors have found that it is advantageous to modify the catalyst layout on the MEA to improve MEA lifetime and fuel cell efficiency. In some exemplary embodiments of the invention, the catalyst layout has been modified by increasing the spacing between the catalyst layout and one of the inlet and outlet apertures of the corresponding flow field plate that provides reactant fluid to the MEA. The increased spacing includes the region of the catalyst layout that is in close proximity to the area of the MEA that initially receives the reactant fluid flow from the inlet aperture or sends the remaining reactant gas fluid flow to the corresponding flow field plate.

In other exemplary embodiments of the invention, the catalyst layout has been modified by increasing the spacing between the catalyst layout and the inlet and outlet apertures of the corresponding flow field plate that provides reactant gas to the MEA. The increased spacing includes the region of the catalyst layout that is in close proximity to the area of the MEA that initially receives the reactant fluid flow from the inlet aperture as well as the region of the catalyst layout that is in close proximity to the area of the MEA in which the reactant fluid flow is recombined and fed to the outlet aperture of the corresponding flow field plate.

Various shapes may be used for the catalyst layout to increase the spacing from the inlet and or outlet apertures. These shapes may include straight edges, angled edges or tapered edges.

Another feature of the invention is that in addition to increasing the spacing of the catalyst layout from at least one of the inlet and outlet apertures, the overall area of the catalyst layout may be adjusted to coincide with the overall area of the coolant flow field on either of the corresponding anode or cathode flow field plates. This helps to reduce localized temperature increases in the catalyzed area during fuel cell operation.

The inventors have found that modifying the catalyst layout as indicated in the various embodiments shown herein improves reactant fluid flow, reduces wear on the MEA and improves the distribution of the reactant fluid over the entire surface area of the MEA. This in turn increases fuel cell efficiency and lifetime.

In a first aspect, at least one embodiment of the invention provides an electrochemical cell assembly comprising first and second flow field plates each including an active surface facing one another, and each having first and second sets of apertures for reactant fluid flow and optionally coolant flow, each set of apertures including an inlet aperture and an outlet aperture, the plates further including a feed structure for enabling reactant fluid flow from one of the inlet apertures along the active surface to the corresponding outlet aperture; first and second gas diffusion media disposed between the first and second flow field plates; and, a membrane electrode assembly, disposed between the first and second gas diffusion media, including: a proton exchange membrane; and, a catalyst layer on each surface of the proton exchange membrane having a catalyst layout being generally disposed in between the first and second sets of apertures, wherein, for at least one surface of the membrane electrode assembly, the spacing between one of the apertures involved with the reactant fluid flow that is provided to the corresponding catalyst layer, and at least one portion of the nearest edge of the corresponding catalyst layout adjacent to the one of the apertures is increased for enabling at least a portion of the reactant fluid flow to first encounter a region of the membrane electrode assembly without the catalyst layout.

In a second aspect, at least one embodiment of the invention provides an electrochemical cell assembly comprising: first and second flow field plates each including an active surface facing one another, and each having a first inlet aperture, a first outlet aperture, a reactant fluid flow field structure on the active surface, a first feed structure for providing reactant fluid flow from the inlet aperture to the reactant fluid flow field structure and a second feed structure for providing reactant fluid flow from the reactant fluid flow field structure to the outlet aperture; first and second gas diffusion media disposed between the first and second flow field plates; and, a membrane electrode assembly, disposed between the first and second gas diffusion media, including: a proton exchange membrane; and, a catalyst layout on each surface of the proton exchange membrane having a catalyst layout being generally disposed in between the first inlet and outlet apertures, wherein the spacing between one of the apertures and at least one portion of the nearest edge of the corresponding catalyst layout is increased for enabling at least a portion of the corresponding feed structure to overlie a region of the membrane electrode assembly without the catalyst layout and directly provide the reactant fluid flow to a region of the membrane electrode assembly not having the catalyst layout.

In another aspect, at least one embodiment of the invention provides a membrane electrode assembly for use in an electrochemical cell assembly comprising: a proton exchange membrane; and, a catalyst layer on each surface of the proton exchange membrane having a catalyst layout being generally disposed in between first and second apertures of the electrochemical cell assembly including an inlet aperture and an outlet aperture, wherein the spacing of at least one portion of the nearest edge of the corresponding catalyst layout adjacent to one of the apertures is increased for enabling at least a portion of reactant fluid flow from the one of the apertures of the electrochemical cell assembly to first encounter a region of the membrane electrode assembly without the catalyst layout.

In yet another aspect, at least one embodiment of the invention provides a membrane electrode assembly for use in an electrochemical cell assembly comprising: a proton exchange membrane; and, a catalyst layer on a surface of the proton exchange membrane having a catalyst layout being generally disposed in between inlet and outlet apertures of the electrochemical cell assembly, wherein the spacing of at least one portion of the nearest edge of the catalyst layout adjacent to one of the apertures is increased for enabling, in use, at least at least a portion of a feed structure that is associated with the one of the apertures, to overlie a region of the membrane electrode assembly without the catalyst layout to directly provide the reactant fluid flow to a region of the membrane electrode assembly not having the catalyst layout.

BRIEF DESCRIPTION OF THE DRAWINGS

For a better understanding of the invention and to show more clearly how it may be carried into effect, reference will now be made, by way of example only, to the accompanying drawings which show exemplary embodiments of the invention and in which.

DETAILED DESCRIPTION OF THE INVENTION

Figure 1:
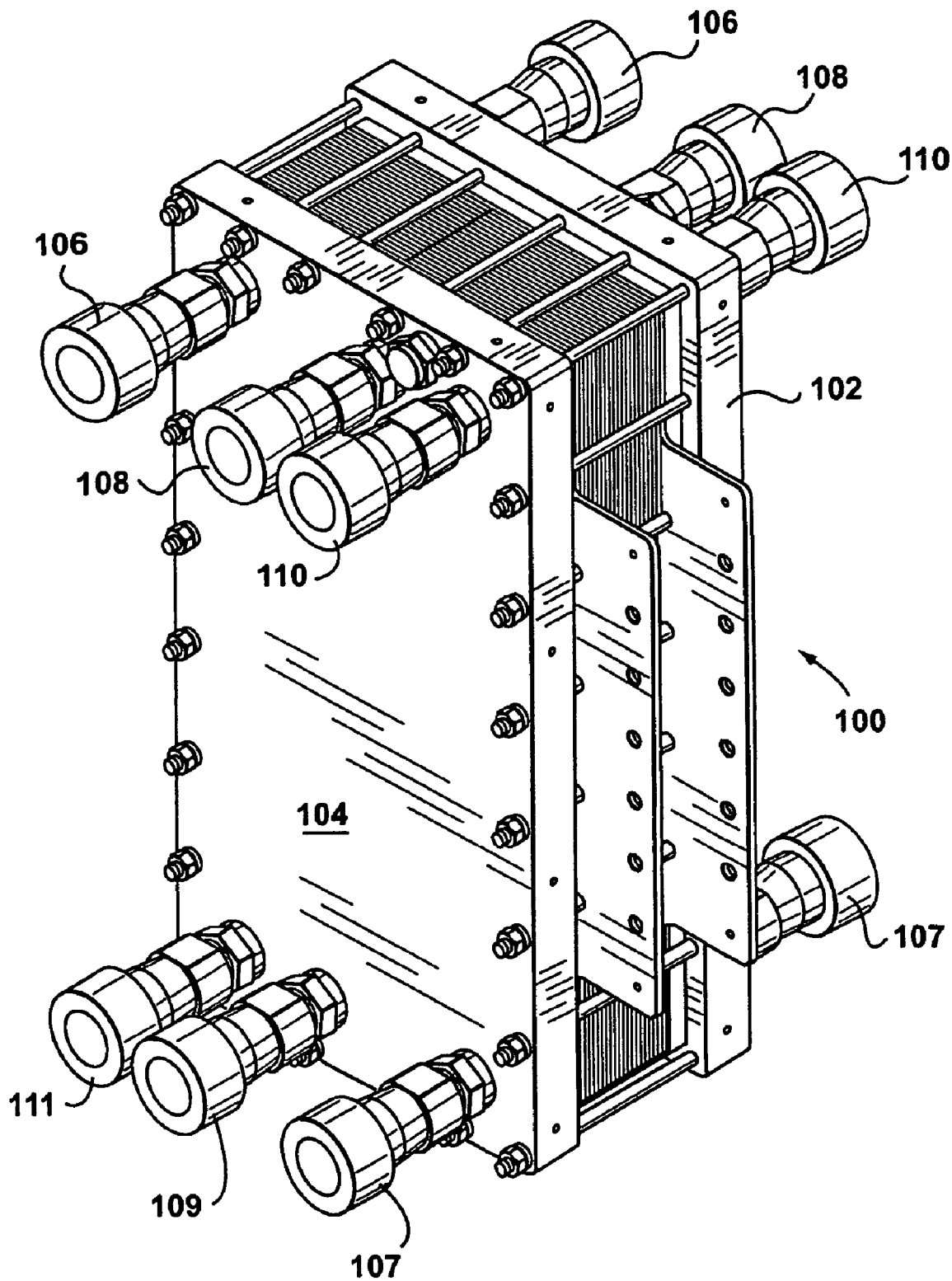
FIG. 1 shows an isometric view of a fuel cell stack.

In the following detailed description, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention. Further, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. In addition, structural dimensions are provided for exemplary purposes only and are not meant to limit the invention.

There are various known types of electrochemical cells. Examples of such cells currently receiving great interest in the industry are fuel cells and electrolyzer cells. The description below will exemplify a fuel cell. However, the general principles of the invention apply to all electrochemical cells.

Figure 2:
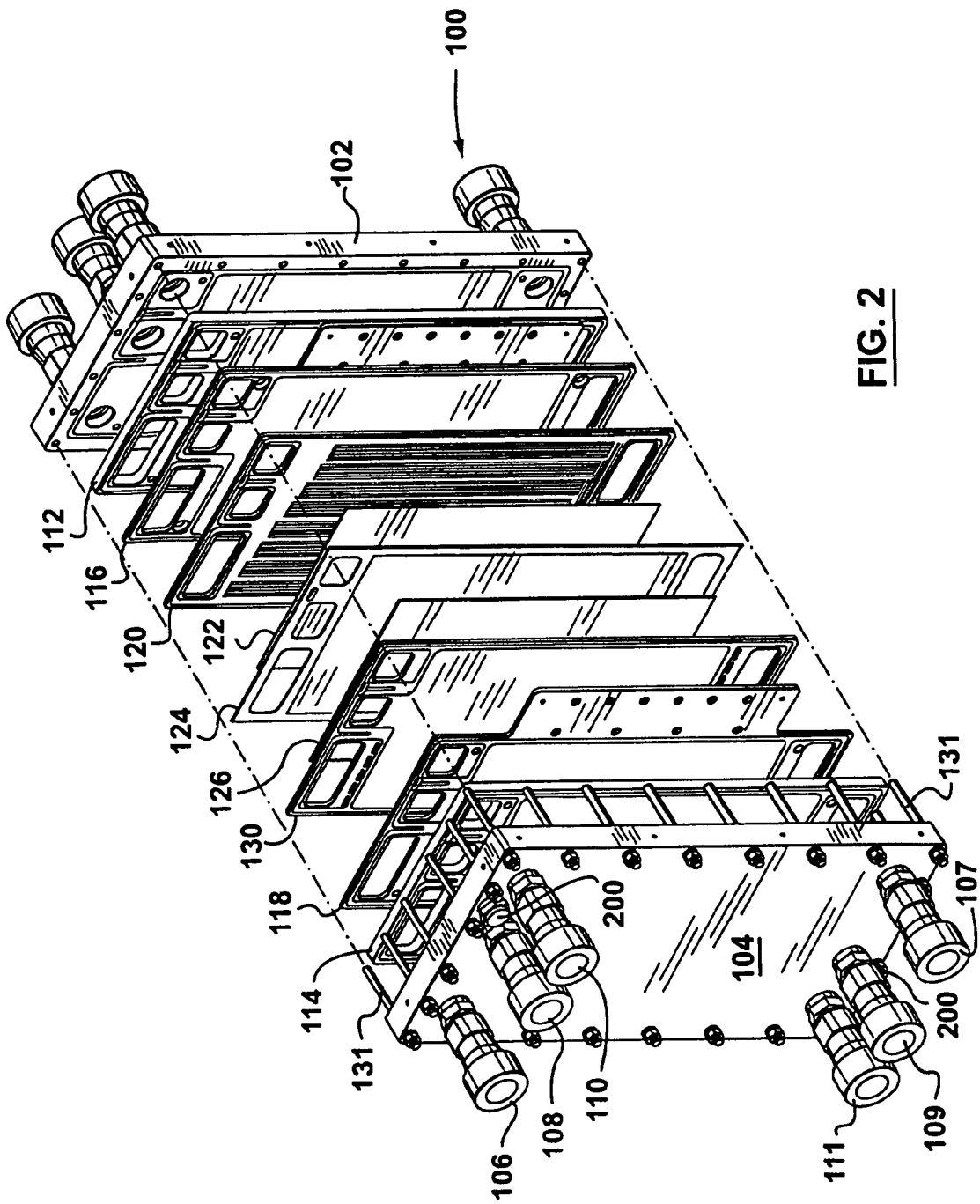
FIG. 2 shows an isometric exploded view of the fuel cell stack of FIG. 1, to show individual components thereof and components of one fuel cell.

Referring first to FIGS. 1 and 2, shown therein are basic elements of a fuel cell stack 100. The fuel cell stack 100 includes an anode endplate 102 and cathode endplate 104 that, in known manner, are provided with connection ports for supply of the necessary fluids. Air connection ports are indicated at 106 and 107; coolant connection ports are indicated at 108 and 109; and hydrogen connection ports are indicated at 110 and 111. Although not shown, it will be understood that corresponding coolant and hydrogen ports, corresponding to ports 109 and 111 are provided on the anode side of the fuel cell stack. Alternatively, contrary to what is shown in FIGS. 1 and 2, the fuel cell stack 100 may, in known manner, include a dry end without any ports. The various ports 106-111 are connected to distribution channels or ducts that extend all the way through the fuel cell stack 100, to enable connection of the fuel cell stack 100 to various equipment as necessary. This also enables a number of fuel cell stacks to be connected together, in known manner.

Immediately adjacent the anode and cathode endplates 102, 104, there are insulator plates 112 and 114. Immediately adjacent the insulators plates 112 and 114, in known manner, there is an anode current collector plate 116 and a cathode current collector plate 118.

Between the current collector plates 116 and 118, there is a plurality of fuel cells. In this example, there are ten fuel cells. FIG. 2, for simplicity, shows an exploded view of the elements of just one fuel cell. Thus, there is shown in FIG. 2 an anode flow field plate 120, a first or anode gas diffusion layer or media 122, an MEA 124, a second or cathode gas diffusion layer 126 and a cathode flow field plate 130.

To hold the assembly together, tie rods 131 are provided, which are screwed into threaded bores in the anode endplate 102, passing through corresponding plain bores in the cathode endplate 104. In known manner, nuts and washers are provided, for tightening the whole assembly and to ensure that the various elements of the individual fuel cells are clamped together.

In the following description, it is also to be understood that the designations "front" and "rear" with respect to the anode and cathode flow field plates 120 and 130, indicates their orientation with respect to the MEA 124. Thus, the "front" surface of the anode and cathode flow field plates 120 and 130 face towards the MEA 124 while the "rear" surface of the anode and cathode flow field plates 120 and 130 faces away from the MEA 124. Consequently, in FIG. 3b, the configuration of the apertures is reversed as compared to FIG. 3a.

Figure 3A:
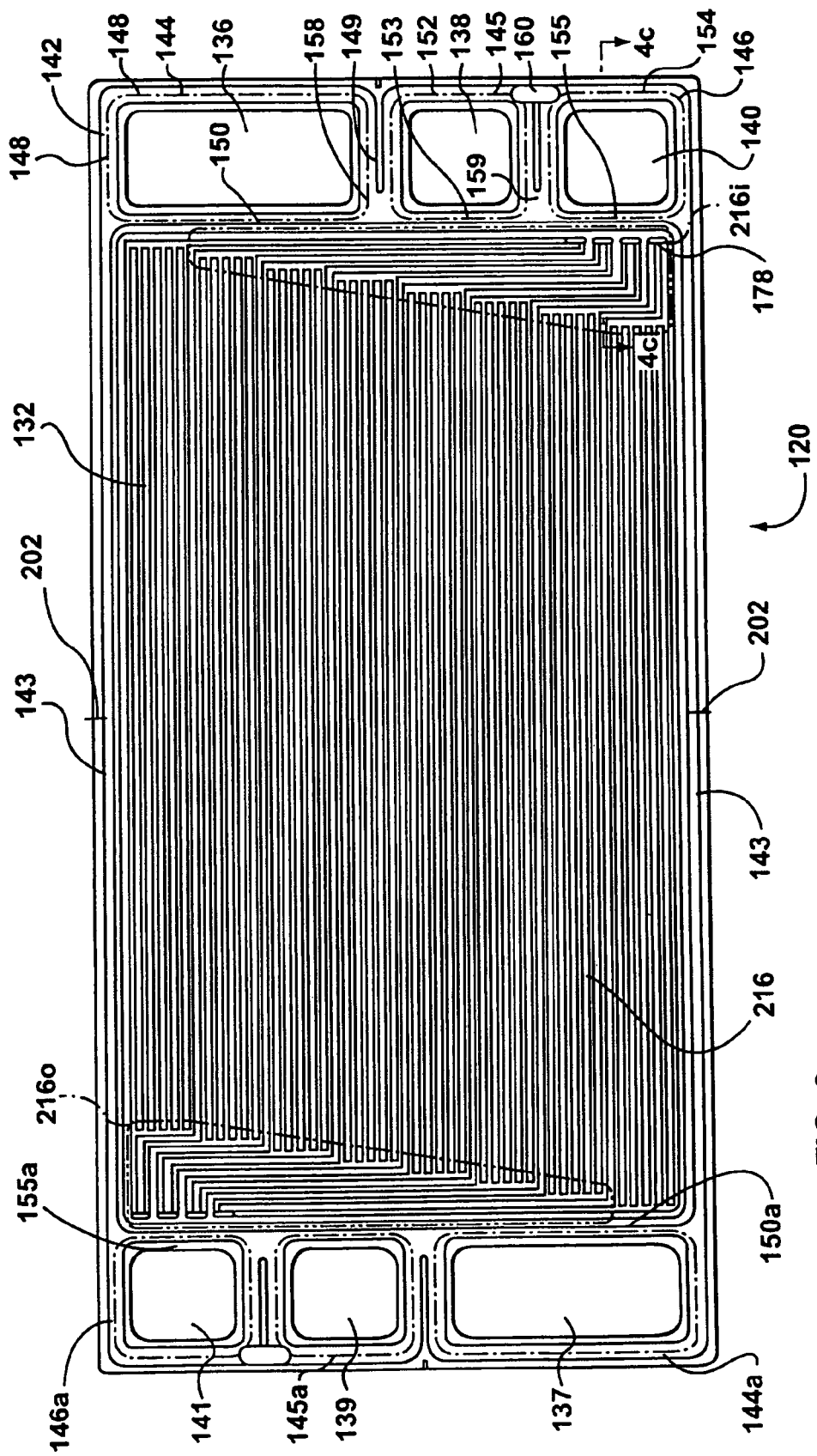
FIGS. 3a and 3b show, respectively, front and rear views of an anode flow field plate of the fuel cell stack of FIGS. 1 and 2.
Figure 3B:
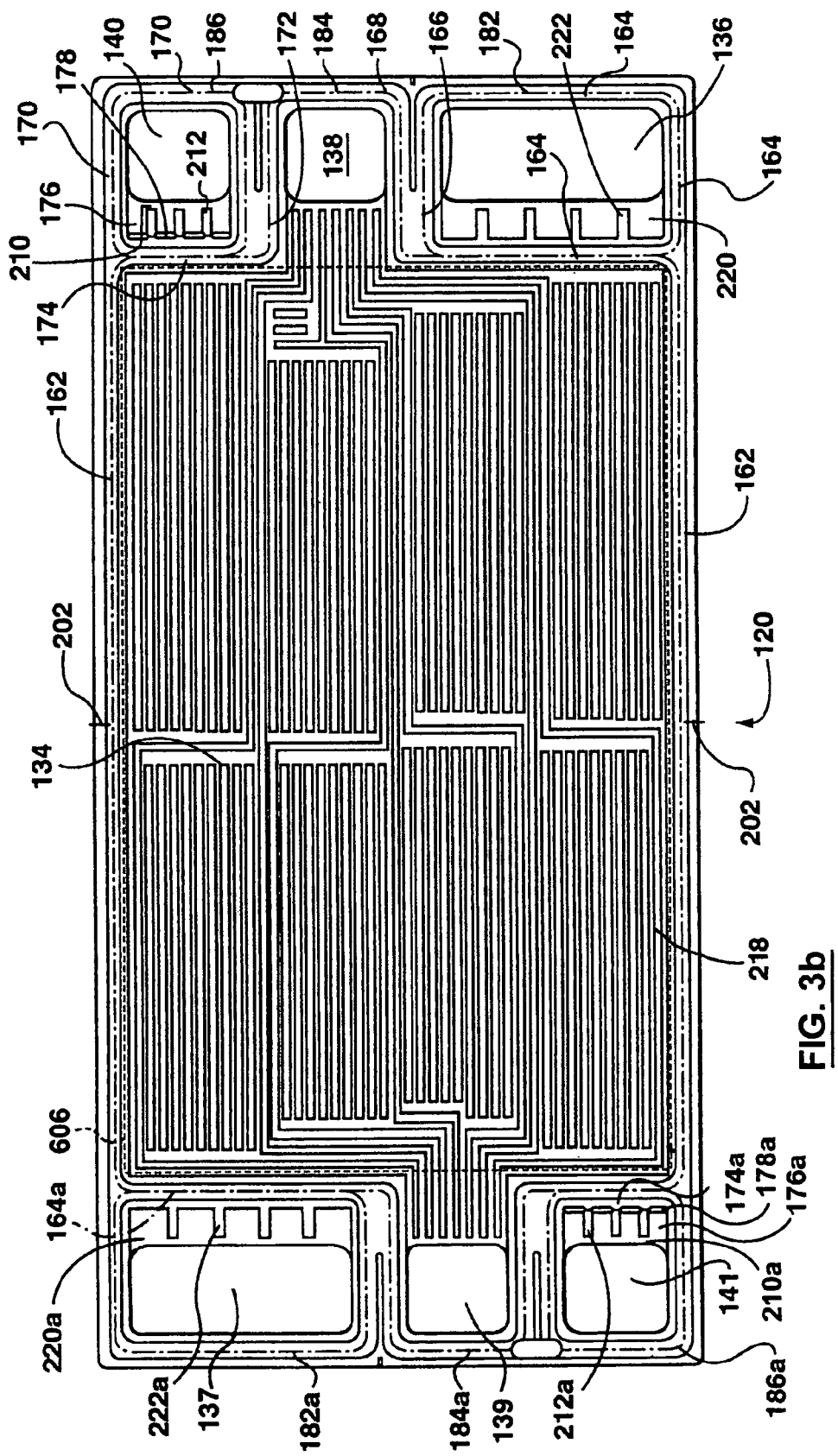

Reference will now be made to FIGS. 3a and 3b which show details of the anode flow field plate 120. As shown, the anode flow field plate 120 is generally rectangular, but can be any geometry, and includes a front or inner face 132 shown in FIG. 3a and a rear or outer face 134 shown in FIG. 3b. The front face 132 provides channels for the hydrogen, while in this particular embodiment, the rear face 134 provides a channel arrangement to facilitate cooling. Alternatively, the channel arrangement to facilitate cooling may also or only be provided on the rear of the cathode flow field plate 130.

Corresponding to the ports 106-111 of the whole fuel cell stack 100, the anode flow field plate 120 has rectangular apertures 136, 137 for air flow; generally square apertures 138 and 139 for coolant flow; and generally square apertures 140 and 141 for hydrogen flow. These apertures 136-141 are aligned with the ports 106-111. Corresponding apertures are provided in all elements of the fuel cell stack 100 so as to define ducts or distribution channels extending through the fuel cell stack 100 in known manner.

Conventionally, for each pair of flow field plates in a fuel cell, a seal is provided around the reactant flow field plate and the various inlets and outlets to prevent leaking or mixing of reactant gases and coolant. The seal may be a pre-formed gasket made of resilient materials compatible with a fuel cell environment which is seated in a seal groove provided on the front face of the reactant flow field plate; the seal is formed such that it completely encloses the flow field plate and the inlet and outlet apertures, permitting a reactant gas to only flow from an inlet aperture to an associated outlet aperture.

Now, in this exemplary embodiment, in accordance with an invention disclosed in U.S. patent application Ser. No. 09/854,362, which is herein incorporated by reference, to seal the various elements of the fuel cell stack 100 together, the flow field plates 120 and 130 are provided with grooves to form a groove network, that, as detailed below, is configured to accept and to define flow channels for a sealant that forms seals through the fuel cell stack 100. During assembly, a sealant material is injected through these various grooves, so as to fill the grooves entirely. The sealant material is then cured, e.g. by subjecting it to a suitable elevated temperature, to form a complete seal. Both sealing techniques, or any other suitable sealing technique, can be used with the membrane electrode assembly of the invention.

On the front face 132, a front groove network or network portion is indicated at 142. The groove network 142 has a depth of 0.024" and the width varies as indicated below. The groove network 142 includes side grooves 143. These side grooves 143 have a width of 0.153".

At one end, around the apertures 136, 138 and 140, the groove network 142 provides corresponding rectangular groove portions. Rectangular groove portion 144, for the air flow 136, includes outer groove segments 148, which continue into a groove segment 149, all of which have a width of 0.200". An inner groove segment 150 has a width of 0.120". For the aperture 138 for cooling fluid, a rectangular groove 145 has groove segments 152 provided around three sides, each again having a width of 0.200". For the aperture 140, a rectangular groove 146 has groove segments 154 essentially corresponding with the groove segments 152 and each again has a width of 0.200". For the groove segments 152 and 154, there are inner groove segments 153 and 155, which like the groove segment 150, have a width of 0.120".

It is to be noted that, between adjacent pairs of apertures 136, 138, and 138, 140, there are groove junction portions 158 and 159 having a total width of 0.5", to provide a smooth transition between adjacent groove segments. This configuration of the groove junction portion 158, and the reduced thickness of the groove segments 150, 153 and 155, as compared to the outer groove segments, is intended to ensure that the sealant material flows through all the groove segments and fills them uniformly.

To provide a connection through the various flow field plates and the like, a connection aperture 160 is provided, which has a width of 0.25", rounded ends with a radius of 0.125" and an overall length of 0.35". As shown, in FIG. 3a, the connection aperture 160 is dimensioned so as to clearly intercept the groove segments 152 and 154. This configuration is also found in the end plates 102 and 104, insulator plates 112 and 114 and current collection plates 116 and 118 as the connection aperture 160 continues through to the end plates 102 and 104 which have a corresponding groove profile.

The rear seal profile of the anode flow field plate 120 is shown in FIG. 3b. This includes side grooves 162 with a larger width of 0.200", as compared to the side grooves on the front face 132. Around the air aperture 136, there are groove segments 164 with a uniform width also of 0.200". These connect into a first groove junction portion 166.

For the coolant aperture 138, groove segments 168, also with a width of 0.200", extend around three sides. As shown, the aperture 138 is open on the inner side to allow cooling fluid to flow through the cooling channel network 218 shown. The flow channels 218 extend between the coolant apertures 138 and 139. The cooling channel network 218 promotes uniform distribution of coolant flow across the rear of the flow field plate 120.

For the fuel or hydrogen aperture 140 there are groove segments 170 on three sides. A groove junction portion 172 joins the groove segments around the apertures 138 and 140.

An innermost groove segment 174, for the aperture 140 is set in a greater distance, as compared to the groove segment 155. This enables backside flow channels 176 to be provided extending under the groove segment 155. At least one transfer slot 178 is then provided for enabling flow of reactant gas from one side of the flow field plate 120 to the other. As shown in FIG. 3a, the transfer slots 178 emerge on the front face 132 of the anode flow field plate 120, where a channel network 216 is provided to distribute the reactant gas flow evenly across the front side 132 of the anode flow field plate 120. The complete rectangular grooves around the apertures 136, 138 and 140 in FIG. 3b are designated 182, 184 and 186 respectively.

The anode flow field plate 120 provides, on its rear side, projections 212 separating flow channels 176. These projections 212 do not reach the edge of the aperture 140, thereby providing an aperture extension between the aperture 140 and the flow channels 176. The reactant gas is directed from the aperture 140 to the aperture extension, which helps to evenly distribute the reactant gas flow, prior to the introduction of the reactant gas to the flow channels 176. The reactant gas flow then enters the transfer slots 178 which direct the reactant gas flow to the front surface 132 of the anode flow field plate 120.

As shown in FIGS. 3a and 3b, the configuration of the sealing groves for the apertures 137, 139 and 141 and the reactant gas flow channels for the outlet of the reactant gas for aperture 141, which may be referred to as outlet collection channels 216o, at the other end of the anode flow field plate 120 corresponds to the configuration of the sealing grooves for the apertures 136, 138 and 140 and the reactant gas flow channels for the inlet of the reactant gas for aperture 140, which may be referred to as inlet distribution channels 216i, respectively. The reactant gas flow channels in between the inlet distribution channels and the outlet collection channels may be referred to as primary channels. The velocity of the reactant gas may be strongest in the inlet distribution channels and hottest in the outlet collection channels. Further, the primary channels provide reactant gas flow adjacent to the GDM 122 and 126 so that the reactant gas may diffuse across the MEA 124 and take place in the reactions necessary to create electricity. For simplicity and brevity, the description of these channels is not repeated. The same reference numerals are used to denote the various groove segments, junction portions and the like, but with a suffix "a" to distinguish them, e.g. for the groove portions 144a, 145a and 146a, in FIG. 3a. Further, the cathode flow field plate 130 includes similar channels for sealing and reactant gas flow as well as transfer slots to facilitate a backside feed of the reactant oxidant gas. The cathode flow field plate 130 may or may not have coolant flow channels. For simplicity and brevity, the cathode flow field plate 130 will not be described in detail.

It should be noted that on the front face 132 of the anode flow field plate 130, all of the apertures 136-141 are closed off from the reactant gas flow channels. To provide flow of hydrogen, fuel gas, the transfer slots 178 are provided, extending through to the rear or backside of the anode flow field plate 120. As shown in FIG. 3b, each of the apertures 140 and 141 includes an aperture extension 210 that extends under the inner grooves segments 155 and 155a. The groove network 142 on the front face 132 includes groove portions on a sealing surface portion that enclose the apertures 140 and 141 and separate them from a main active area including the transfer slots 178. On the rear side 134 of the anode flow field plate 120, groove portions or sealing surface portions enclose both the apertures 140, 141 and the transfer slots 178. Each of these aperture extensions 210 includes the projections 212, defining flow channels 176, providing fluid communication between the respective aperture 140 and 141 and the transfer slots 178.

The numerous groove segments 174, for the seal or gasket are then offset, i.e. they are not located directly opposite, the groove segments 155, 155a. The result of this is that on the rear side, the transfer slots 178 are connected by the flow channels 176 to the apertures 140 and 141; on the front face, the transfer slots 178 open directly into the inlet distribution channels which lead to the primary reactant gas flow channels 216 of the active area extending across the front face 132 of the anode flow field plate 120.

Another feature of the projections 212 is to ensure adequate support for the portion of the anode flow field plate 120 forming the grooves segments 155 and 155a. Corresponding projections are provided on the rear of the cathode flow field plate 130, and all these projections are flush with the surface of the respective flow field plates, so that the projections from the anode and cathode flow field plates 120 and 130 abut one another, to support the respective groove segments.

For the apertures 136 and 137 for flow of air or other oxidant, again aperture extensions 220 and 220a are provided. Corresponding to the apertures 136 and 137 these extensions 220 and 220a extend under the groove segments 150 and 150a to provide support for them. Rear groove segments 164 and 164a on the rear face of the plate 120 are then offset inwardly. Corresponding to the projections 212, projections 222 are provided, complementing the projections on the cathode flow field plate.

Figure 4A:
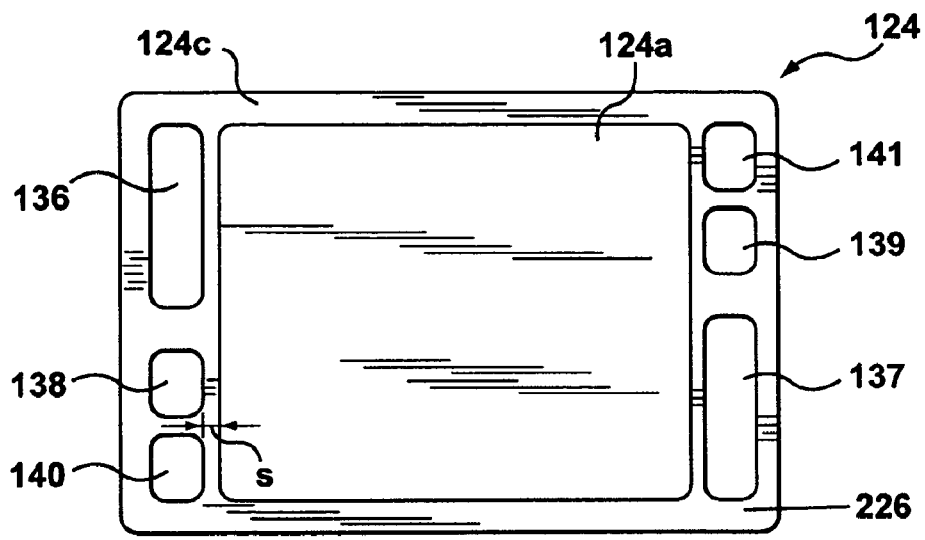
FIGS. 4a and 4b are top and bottom views of an embodiment of a conventional MEA.
Figure 4B:
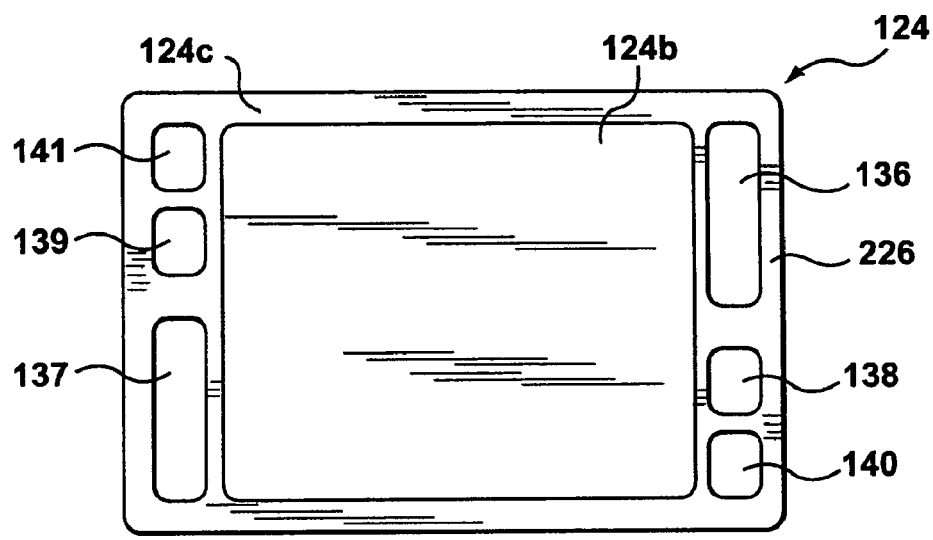

Referring now to FIGS. 4a and 4b, shown therein are top and bottom views, respectively, of the MEA 124. The top surface of the MEA 124 shown in FIG. 4a is facing the front face 132 of the anode flow field plate 120; hence the orientation of the apertures 136-141 relative to the orientation shown in FIG. 3a. Further, the bottom surface of the MEA 124 shown in FIG. 4b is facing the front face of the cathode flow field plate 130.

The MEA 124 comprises a total of three layers, namely: a central PEM layer 124c and catalyst layers 124a and 124b on either side of the PEM layer 124c to promote the reactions necessary for fuel cell operation. Other materials may be added to the catalyst layers as is commonly known to those skilled in the art. The PEM layer 124c is typically made from a proton conducting material, such as a polymer, an ionomer, a fluoropolymer, or mylar, etc, that permits protons to pass through but not electrons. Generally, any suitable polymer or ionomer material that conducts protons, as is known by those skilled in the art, may be used as the PEM layer 124c.

The PEM layer 124c may also include a sub-gasket member 226, as is commonly known by those skilled in the art, situated around the catalyst layout 124a to provide structural support and to increase the durability of the MEA 124. The sub-gasket member 226 may also be used to provide extra sealing as well. Further, the sub-gasket member 226 may be used to protect the MEA 124 from the GDM 122 since the GDM 122 may have some rough edges or fibers that may damage the edges of the catalyst layout 124a. Accordingly, the sub-gasket member 226 may surround the catalyst layout 124a and help to prevent membrane holes by preventing the GDM fibers from punching through the membrane in these perimeter regions. The sub-gasket member 226 may extend to the edges of the MEA 124. Accordingly, the sub-gasket member 226 may be viewed as a sheet with cutouts for the catalyst area 124a and the apertures 136-141. The sub-gasket member 226 may be bonded to the PEM layer 124c. There is a corresponding sub-gasket member 226b on the other side of the MEA 124. The sub-gasket member 226 may be made from some inert material such as a suitable plastic that is sufficiently rigid, as is commonly known by those skilled in the art. The sub-gasket member 226 may have a thickness of approximately 2 thou, for example, while the PEM 124c of the MEA 124 may have a thickness of approximately 1 thou.

The MEA 124 may further include a plurality of alignment notches (not shown) in order to accommodate the electrochemical cell stack assembly process in which alignment bars are used to line up the components of the fuel cell stack 100. The alignment notches may be located along the perimeter of the outside of the MEA 124 at various locations. The alignment notches will coincide with similar notches on other components of the fuel cell. However, a different assembly process may be used in which case alignment notches may not be necessary. The MEA 124 may also be extended so that the surface area of the MEA 124 is larger than that of the flow field plates 120 and 130 to prevent electrical shorting from occurring. This is described in further detail in Applicant's U.S. patent application having Ser. No. 10/926,107 which is hereby incorporated by reference.

For a given fuel cell, the anode and cathode flow field plates 120, 130 provide a first set of apertures 136, 138 and 140 and a second set of apertures 137, 139 and 141. The MEA 124 provides a corresponding third set of apertures 136, 138 and 140 and a fourth set of apertures 137, 139 and 141. The apertures 136-141 on the flow field plates 120, 130 and the MEA 124 align to form reactant and coolant ducts throughout the fuel cell stack 100.

The first and second GDMs 122 and 126 substantially cover the active layouts 124a and 124b and hence do not extend to the ducts formed by the apertures 136-141. The GDMs 122 and 126 are usually maintained pressed against the catalyst layers 124a and 124b to ensure adequate electrical conductivity and reactant gas access to the catalyst layers 124a and 124b. The GDMs 122 and 126 may be made from porous, conductive carbon-based materials. The most commonly used materials are carbon paper, and carbon cloth with a bonded layer of carbon powder.

The catalyst layouts 124a and 124b are conventionally arranged in a rectangular format between the third set of apertures 136, 138 and 140 and the fourth set of apertures 137, 139 and 141. The catalyst layouts 124a and 124b cover the majority of the area between the third and fourth set of apertures and the edges of the catalyst layouts 124a and 124b are typically spaced quite close to these apertures. The spacing between an inlet aperture and the edge of the catalyst layout 124a may be selected according to width of the inner groove segments, such as groove segment 150, which for example may be 0.12". This spacing is labeled as s between the inlet aperture 140 and the closest edge of the catalyst layout 124a. Since the catalyst layout is so close to the inlet aperture, as is always done in conventional MEAs, when the reactant gas flow first diffuses through the GDMs 122 and 126, in a region proximal to the inlet apertures 140 and 136, the reactant gas flow immediately encounters a portion of the catalyst layout 124.

Figure 4C:
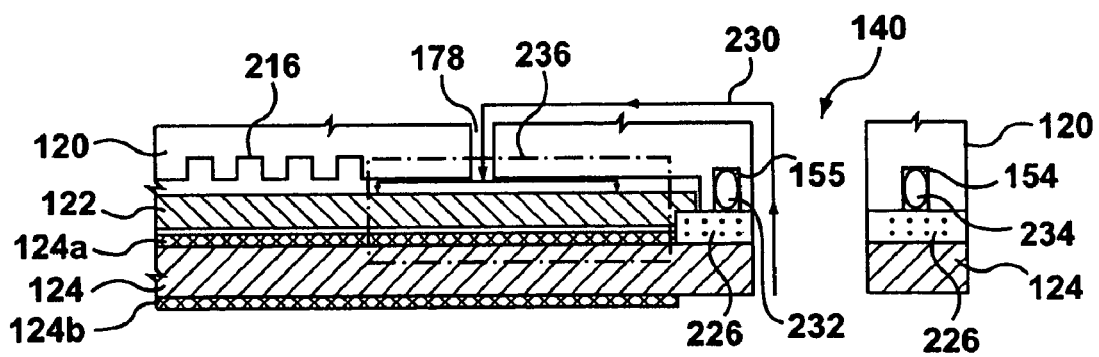
FIG. 4c is a partial cross-sectional view of a portion of a fuel cell showing reactant gas flow along a portion of the MEA of FIGS. 4a and 4b near the inlet aperture of the corresponding anode flow field plate.

Referring now to FIG. 4c, shown therein is a partial cross-sectional view of a portion of a fuel cell showing reactant gas flow 230 along a portion of the MEA 124 near the inlet aperture 140 of the corresponding anode flow field plate 120. The following description will refer to the anode side of the MEA 124 depicted in FIG. 4a for ease of description but it should be understood that the same effect occurs for the cathode side of the MEA 124 (shown in FIG. 4b) with the oxidant reactant gas that flows along the cathode flow field plate 130. FIG. 4c corresponds to the lower right portion of the front face 132 of the anode flow field plate 120, the lower left portion of the rear face 134 of the anode flow field plate 120 and the lower left portion of the top of the MEA 124. Seal portions 232 and 234 are included to provide a seal between the anode flow field plate 120 and the MEA 124. In this example, there is also a sub-gasket member 226 for providing further sealing, structural support and protection from the edges of the GDM 122.

The reactant gas flow 230 is in accordance with the backside feed structure of the anode flow field plate 120. Accordingly, in this example, the reactant gas flow 230 is provided through the aperture 140, into the aperture extension 210a, through the backside feed channels 176a to the transfer slots 178a and onto the front surface 132 of the anode flow field plate 120. The reactant gas 230 then flows along the inlet distribution channels and the primary reactant gas flow channels 216 in the anode flow field plate 120 and at least a portion of the react gas 230 diffuses across the GDM 122 and reacts with a portion of the catalyst layout 124a. The excess reactant gas continues to flow along the primary reactant flow field channels 216 and ultimately exits the anode flow field plate 120 via the outlet collection channels and the associated reactant outlet aperture 141.

However, in the region of the flow field plate 120 near the transfer slot 178, indicated by dotted region 236, where a portion of the reactant gas flow 230 is first introduced to the MEA 124, the reactant gas flow 230 is strong, turbulent, and concentrated, and there is a higher pressure and flow rate in this region which results in an over-reaction between the reactant gas and that region of the catalyst and an over-pressure or differential pressure across the membrane 124. This likely leads to an increased rate of erosion as well as stress for this region of the MEA 124. This results in the generation of eddy flows and increased turbulence for the reactant gas. Accordingly, the reactant gas flow 230 is slowed down. Consequently, not as much of the reactant gas 230 reaches the catalyst 124a. In addition, the reactant gas 230 is also not uniformly distributed over the entire area of the catalyst layout 124a. The over-reaction in this area of the catalyst 124a also produces a temperature increase. The temperature increase reduces the efficiency at which the fuel cell operates. Further, the temperature increase, the turbulent gas flow, the increased rate of erosion and higher pressure in this region increases the rate of degradation of this area of the catalyst 124a and the MEA 124. As a result, the structural integrity of the MEA 124 is then compromised at a faster rate which reduces the lifetime of the MEA 124.

This problem also occurs on the backside of the MEA 124 where a portion of the catalyst layout 124b over-reacts with the reactant gas that flows along the inlet distribution and primary reactant gas flow channels on the front surface of the cathode flow field plate 130. It should be noted that the backside feed method of providing reactant gas flow to the flow field plate is used for descriptive purposes only. It will be understood by those skilled in the art that this problem of over-reaction between the reactant gas and the portion of the catalyst on the MEA that is in close proximity to an inlet aperture is common to all conventional fuel cell designs. Further, it should be understood that this problem may also occur for the portion of the catalyst 124*a* on the MEA 124 that is in close proximity to the outlet aperture as well as possibly the outlet collection reactant gas flow channels. In this region, the temperature of the reactant gases are at its highest.

Figure 5A:
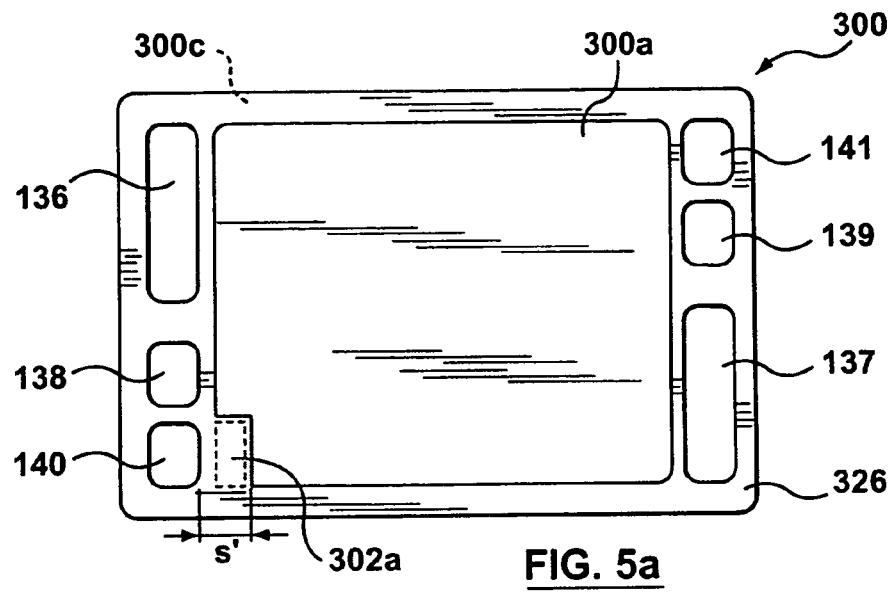
FIGS. 5a and 5b are top and bottom views of an exemplary embodiment of an MEA with a modified catalyst layout in accordance with the invention.
Figure 5B:
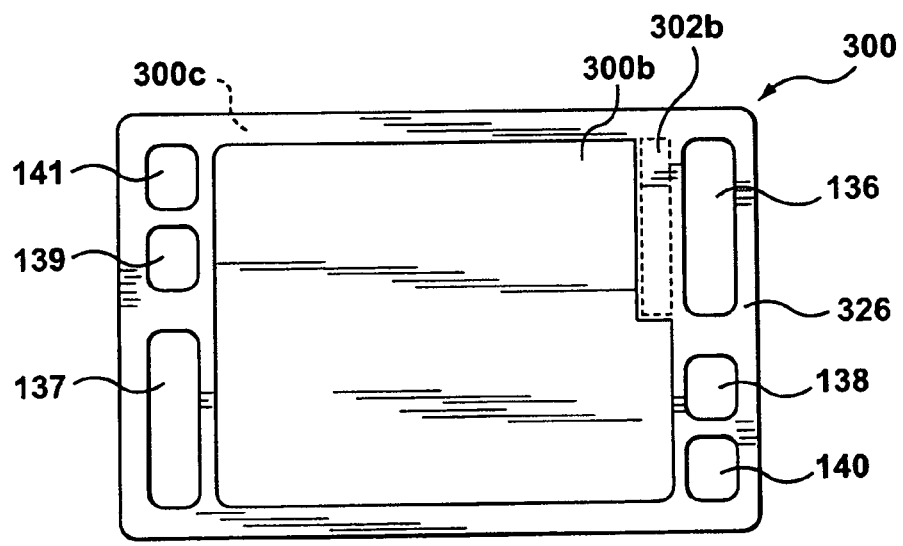

Referring now to FIGS. 5*a* and 5*b*, shown therein are top and bottom views of an exemplary embodiment of an MEA 300 with a modified catalyst layout 300*a* and 300*b* in accordance with the invention. The catalyst layout 300*a* has been altered by increasing the spacing between the inlet aperture 140 and the portion of the catalyst layout 300*a* that is in close proximity to the inlet aperture 140. The dotted portion 302*a* shows the area of the catalyst layout 300*a* that has been removed in comparison to the catalyst layout 124*a*. The catalyst layout 300*b* has also been altered in a similar fashion in the vicinity of the inlet aperture 136 (the portion 302*b* has been removed). Other shapes may be used for the cut-out portion as discussed in further detail below. The increased spacing between the inlet aperture 140 and the closest edge of the catalyst layout 300*a* is represented by the reference label s'. It is readily apparent that the spacing s' is larger than the spacing s used for the conventional MEA 124. It should be understood that there may also be an increased spacing in the vertical dimension compared to the horizontal dimension (represented by s'). A variety of different values can be used for the increased spacing s'. This is discussed in further detail below. It should be noted that there may also be an increased amount of spacing in the vertical direction as well. For instance, with respect to the aperture 140 in FIG. 5*a*, there is a bit of spacing between the top of the aperture 140 and the top of the cutout portion 302*a* for the catalyst layout 300*a*. FIG. 5*b* shows a vertical spacing between the bottom of the cutout portion 302*b* and the bottom of aperture 136. This vertical spacing may be at least on the order of the thickness of 1 to 2 or possibly 1.5 reactant flow field channels (i.e. away from the backside feed slots). Alternatively, the amount of vertical spacing may provide for an overhang of at least 1.5 coolant flow channels (i.e. extend beyond the coolant flow field channels). The vertical spacing is optional and the horizontal edge of any one of the cutout portions 302*a* or 302*b* may be aligned with the horizontal edge of the corresponding aperture. It can also be seen that, in this exemplary embodiment, that sub-gasket members 326 and 326*b* are placed on both surfaces of the PEM 300*c*.

Figure 5C:
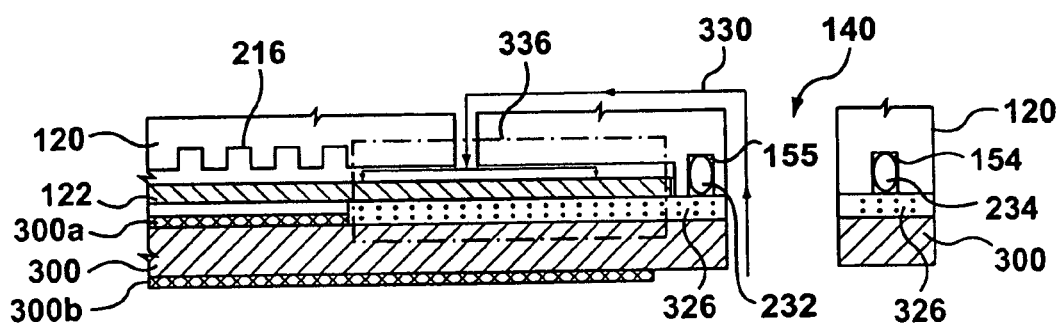
FIG. 5c is a partial cross-sectional view of a portion of a fuel cell showing reactant gas flow along a portion of the MEA of FIGS. 5a and 5b near the inlet aperture of the corresponding anode flow field plate.

Referring now to FIG. 5*c*, shown therein is a partial cross-sectional view of a portion of a fuel cell showing reactant gas flow along a portion of the MEA 300 near the inlet aperture 140 of the corresponding anode flow field plate 120. The following description will refer to the anode side of the MEA 300 depicted in FIG. 5*a* for ease of description but it should be understood that the same effect occurs for the cathode side of the MEA 300 (shown in FIG. 5*b*) with the oxidant reactant gas that flows along the reactant gas flow channels on the cathode flow field plate 130. FIG. 5*c* corresponds to the lower right portion of the front face 132 of the anode flow field plate 120, the lower left portion of the rear face 134 of the anode flow field plate 120 and the lower left portion of the top of the MEA 300. Seal portions 230 and 232 are included to provide a seal between the anode flow field plate 120 and the MEA 300. In this example, there is also a sub-gasket member 326 for providing further sealing, structural support and protection from the edges of the GDM 122.

The reactant gas flow 330 is similar to that shown in FIG. 4*c*. However, in this case, the portion of the reactant gas flow 330 that diffuses across the GDM 122 into region 336 does not react with the catalyst 300*a* on the MEA 300 since portion 302*a* of the catalyst 300*a*, adjacent an edge region of the GDM 122, has been removed. Accordingly, the reactant gas flow 330 is not disturbed when it initially encounters the MEA 300. This allows the pressure head of the reactant gas flow 330 to normalize in region 336 and hence there is a reduction in eddy flows and turbulence as compared to MEA 124. In addition, since there is no over-reaction, there is not much of a temperature increase in reactant gas in this region of the MEA 300. Accordingly, the reactant gas 330 is more uniformly distributed over the entire area of the catalyst layout 300*a* and there is an improvement in the efficiency at which the fuel cell operates. Furthermore, the reactant gas flow 330 first encounters the sub-gasket member 326*b* which is more structurally robust than the catalyst layer 300*a*. In an alternative, the width of the sub-gasket members does not have to be increased relative to the widths used for the sub-gasket members of the conventional MEA 124; rather, the sub-gasket members may simply be placed close in the indentation provided by the increased spacing s'. Alternatively, if the sub-gasket members are not added to the MEA 300, then the reactant gas flow 330 first encounters the ionomer layer 300*c* of the MEA 300 which is also structurally more robust than the catalyst layer 300*a*. In addition, the removal of catalyst material in this area eliminates any hot spots in this area due to electrochemical reaction. In this case, the PEM of the MEA 300 is made thicker than that used for the conventional MEA 124. This also results in a reduction of the erosion rate of the MEA 300 and increases the structural integrity of the MEA 300.

Figure 6A:
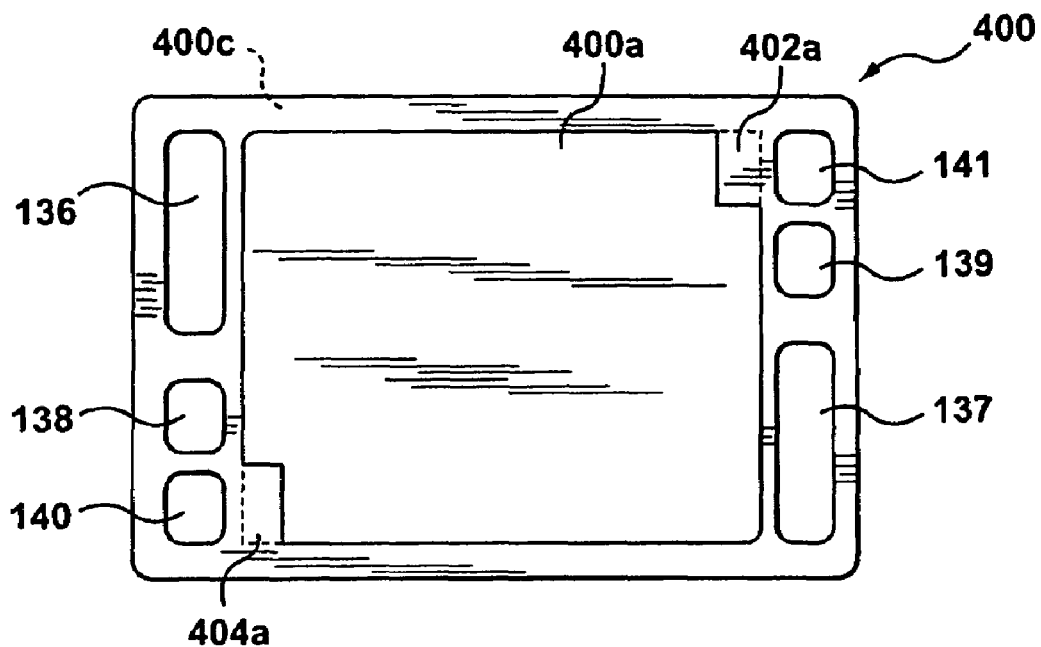
FIGS. 6a and 6b are top and bottom views of another exemplary embodiment of an MEA with a modified catalyst layout in accordance with the invention.
Figure 6B:
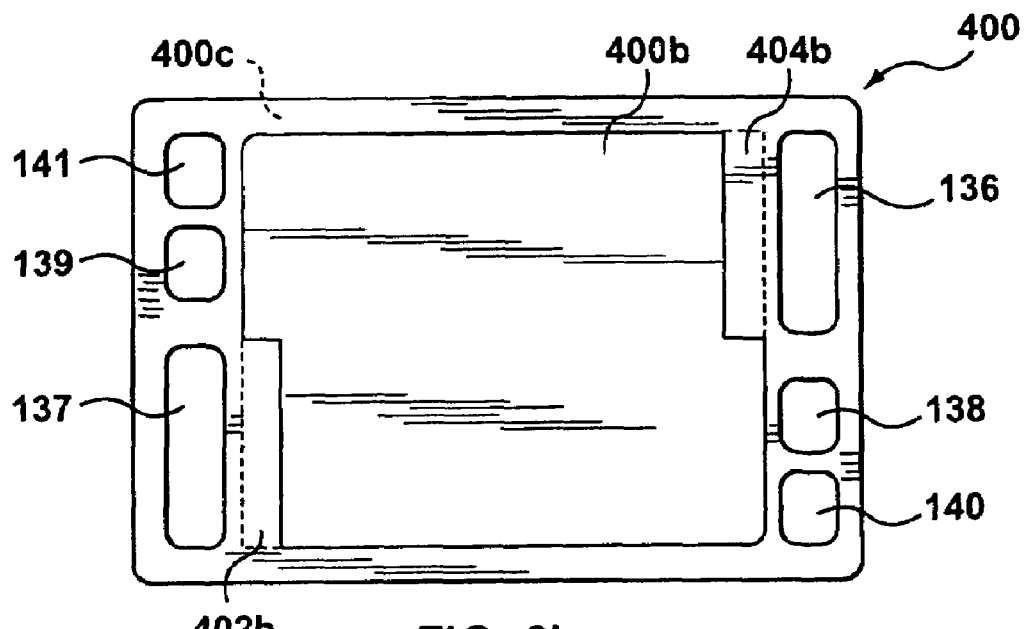

Referring now to FIGS. 6*a* and 6*b*, shown therein are top and bottom views of another exemplary embodiment of an MEA 400 with a modified catalyst layout 400*a* and 400*b* in accordance with the invention. The catalyst layout 400*a* has been altered by increasing the spacing between the portions of the catalyst layout 400*a* that are in the vicinity of the inlet and outlet apertures 140 and 141. The dotted portions 402*a* and 404*a* show the areas of the catalyst layout 400*a* that have been removed in comparison to the catalyst layout 124*a*. The catalyst layout 400*b* has also been altered in a similar fashion in the vicinity of the inlet and outlet apertures 137 and 136 (the portions 402*b* and 404*b* have been removed). Other shapes may be used for the cut-out portion as discussed in further detail below.

The plurality of primary reactant gas flow channels 216 on the front face 132 of the anode flow field plate 120 recombine into a few outlet collection reactant gas flow channels which then feed the outlet aperture 141 via a backside feed structure, that in this case is being fed in reverse (i.e. from the front side 132 to the back side 134 of the anode flow field plate 120). The reactant gas in this region also has an increased temperature in comparison to the reactant gas at any other portion of the reactant gas flow channels.

Due to the increased temperature near the outlet aperture 141, with the conventional MEA 124, there is a tendency for the catalyst 124*a* in the vicinity of the outlet aperture 141 to over-react with the reactant gas which leads to further temperature increase, gas flow turbulence and inefficient fuel cell operation. However, with the MEA 400, there is increased spacing between the aperture 141 and the portion of the catalyst layout 400*a* that is in close proximity to the aperture 141. Accordingly, there is a reduction in the over-reaction in this area of the catalyst 400a. Consequently, for MEA 400 there is a greater reduction in increased temperature and gas flow turbulence as compared to MEAs 124 and 300. Although not shown, the MEA 400 may include sub-gasket members as shown for the MEA 300. Alternatively, the MEA 400 may have an increased thickness compared to conventional MEAs.

Figure 7A:
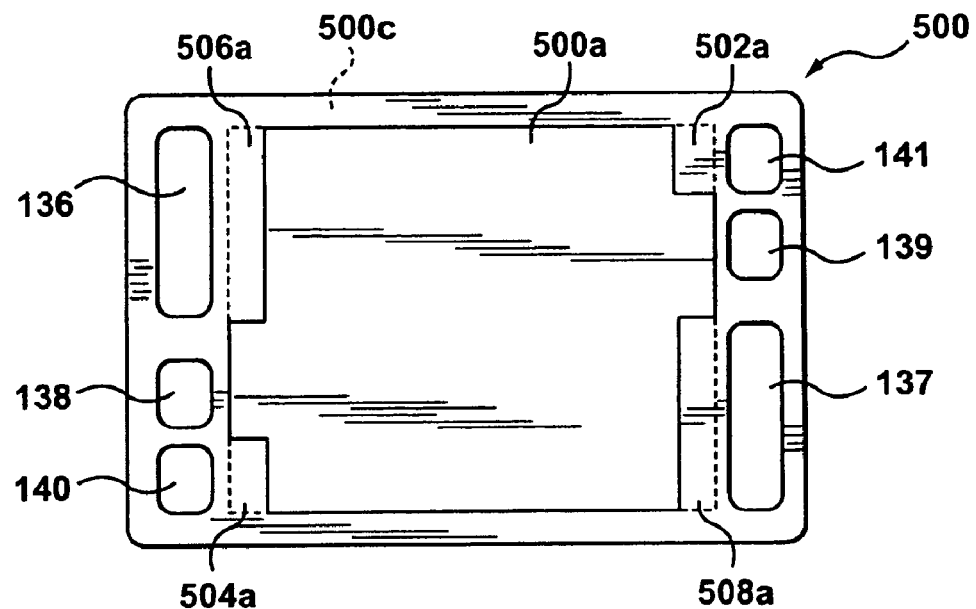
FIGS. 7a and 7b are top and bottom views of another exemplary embodiment of an MEA with a modified catalyst layout in accordance with the invention.
Figure 7B:
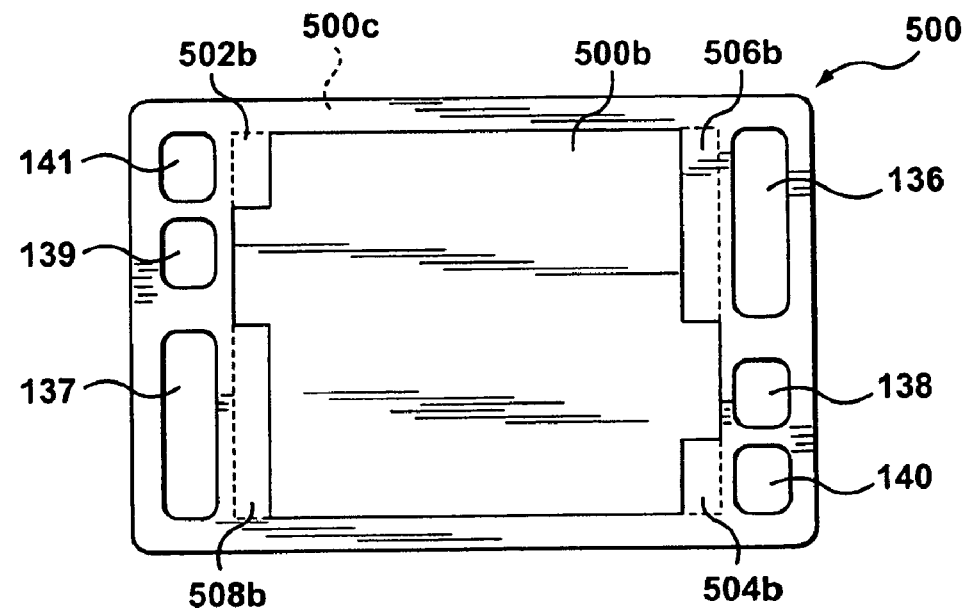

Referring now to FIGS. 7a and 7b, shown therein are top and bottom views of another exemplary embodiment of an MEA 500 with a modified catalyst layout 500a, 500b in accordance with the invention. The catalyst layout 500a has been altered by increasing the spacing between the inlet and outlet apertures 136, 137, 140 and 141 and the portions of the catalyst layout 500a that are in the vicinity of the inlet and outlet apertures 136, 137, 140 and 141. The dotted portions 502a, 504a, 506a and 508a show the areas of the catalyst layout 500a that have been removed in comparison to the catalyst layout 124a. The catalyst layout 500b has also been altered in a similar fashion in the vicinity of the inlet and outlet apertures 136, 137, 140 and 141 (the portions 502b, 504b, 506b and 508b have been removed). Other shapes may be used for the cut-out portion as discussed in further detail below. The catalyst layouts 500a and 500b are symmetrical with respect to one another. Hence, the catalyst layouts 500a and 500b can be more easily deposited onto the MEA 500 during the manufacturing stage while also providing the aforementioned benefits of MEA 400. Although not shown, the MEA 500 may include sub-gasket members as shown for the MEA 300. Alternatively, the MEA 500 may have an increased thickness compared to conventional MEAs.

Figure 8A:
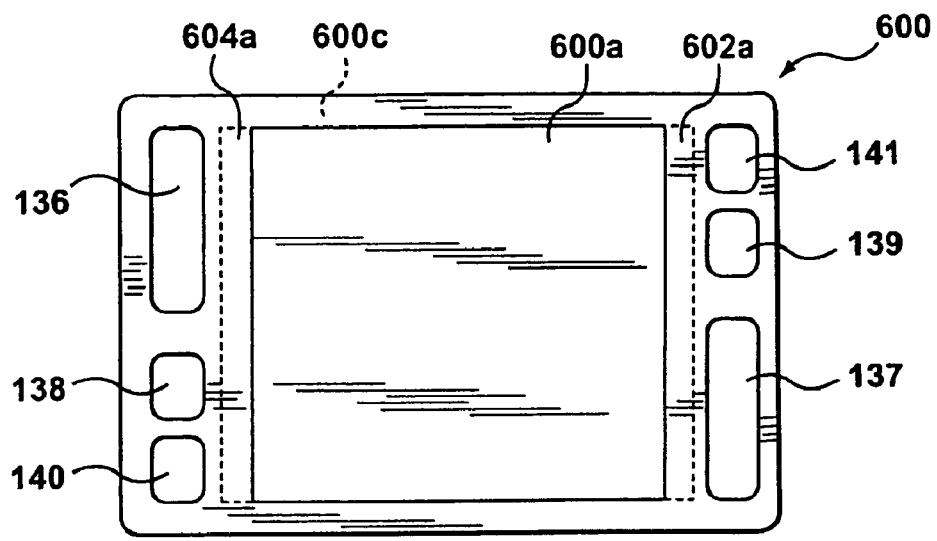
FIGS. 8a and 8b are top and bottom views of another exemplary embodiment of an MEA with a modified catalyst layout in accordance with the invention.
Figure 8B:
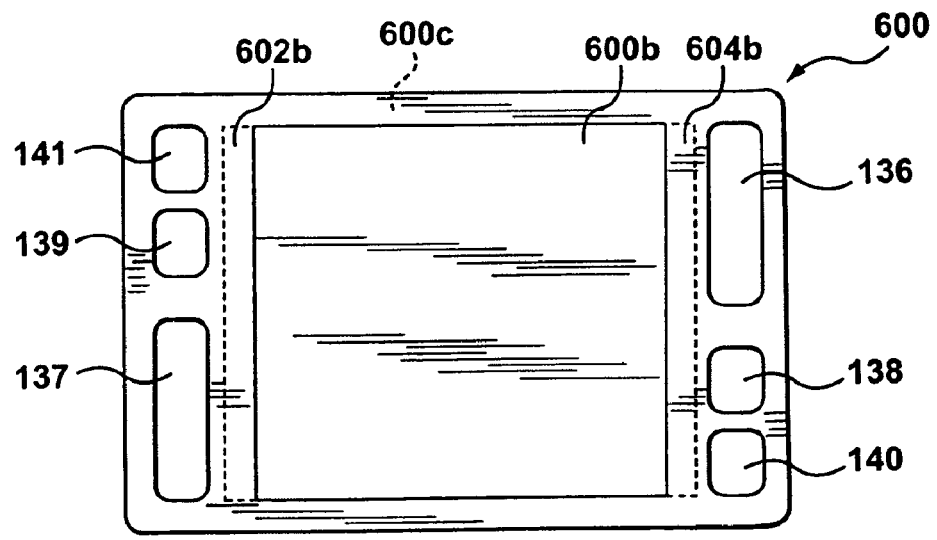

Referring now to FIGS. 8a and 8b, shown therein are top and bottom views of another exemplary embodiment of an MEA 600 with a modified catalyst layouts 600a and 600b in accordance with the invention. Once again, the catalyst layout 600a has been altered by increasing the spacing between the catalyst layout 600a and the inlet and outlet apertures 136, 137, 140 and 141. However, the catalyst layout 600a has been modified by removing rectangular portions 602a and 604a that may extend along the entire vertical extent of the catalyst layout 600a as shown in FIGS. 8a and 8b. The dotted portions 602a and 604a show the areas of the catalyst layout 600a that have been removed in comparison to the catalyst layout 124a. The catalyst layout 600b has also been altered in a similar fashion in the vicinity of the inlet and outlet apertures 136, 137, 140 and 141 (the portions 602b and 604b have been removed). Other shapes may be used for the portions 602a, 604a, 602b and 604b. However, removing rectangular portions, as shown herein, provides catalyst layouts 600a and 600b that are symmetrical with respect to one another. Hence, the catalyst layouts 600a and 600b can be more easily deposited onto the MEA 600 during the manufacturing stage while also providing the aforementioned benefits of MEA 400. Although not shown, the MEA 600 may include sub-gasket members as shown for the MEA 300. Alternatively, the MEA 600 may have an increased thickness compared to conventional MEAs.

In addition, another benefit of the modified MEA 600 is that the surface area of the catalyst layouts 600a and 600b may be substantially similar to the surface area of the coolant flow field 218 on the rear 134 of the anode flow field plate 120. The coolant area is indicated by dotted line 606 in FIG. 3b. It should be noted that the cathode flow field plate 130 may also provide a similar coolant area or be the only flow field plate that provides the coolant area. Previously, with the conventional MEA 124, a portion of the catalyst layout 124a and 124b fell outside of the coolant area 606 and hence could not be cooled as effectively as the rest of the catalyst layout 124a and 124b. This increased temperature affects the efficiency of the MEA 124. This problem is overcome with the MEA 600 since the physical location of the catalyst layouts 600a and 600b on the MEA 600 corresponds with the coolant area 606 on the rear 134 of the anode flow field plate 120. In an alternative, the catalyst layouts 600a and 600b may be slightly larger than the coolant area 606. For instance, the catalyst layouts 600a and 600b may extend past the coolant area 606 by approximately 1 mm, for example, on at least one side of the coolant area 606. It should be noted that the reduction in overall area of the catalyst layout should be balanced with the benefits provided by the increased spacing from the inlet and possibly outlet apertures since a reduction in the area of the catalyst layouts 600a and 600b directly impacts the current/voltage output of the fuel cell. The size reduction of the catalyst layouts 600a and 600b may be in the range of 2 to 5% for example.

Figure 8C:
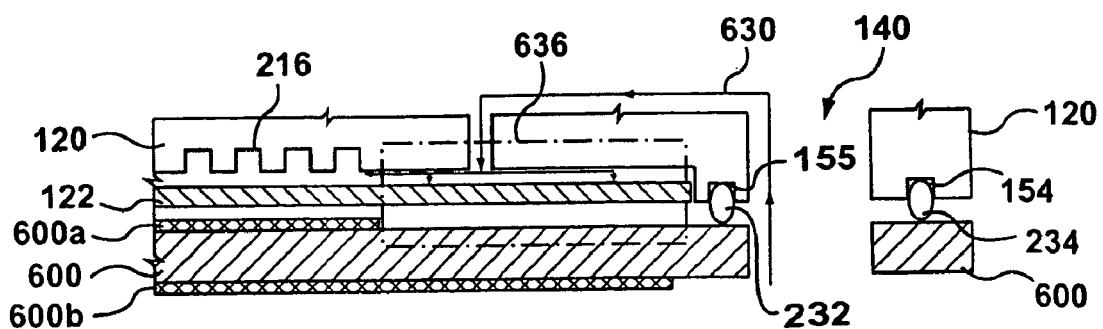
FIG. 8c is a partial cross-sectional view of a portion of a fuel cell showing reactant gas flow along a portion of the MEA of FIGS. 8a and 8b near the inlet aperture of the corresponding anode flow field plate; and, FIGS. 9a and 9b are enlarged views of alternative shapes for the modified catalyst layout in accordance with the invention.

Referring now to FIG. 8c, shown therein is a partial cross-sectional view of a portion of a fuel cell showing reactant gas flow along a portion of the MEA 600 near the inlet aperture 140 of the corresponding anode flow field plate 120. The following description will refer to the anode side of the MEA 600 depicted in FIG. 8a for ease of description but it should be understood that the same effect occurs for the cathode side of the MEA 600 (shown in FIG. 8b) with the oxidant reactant gas that flows along the reactant gas flow channels on the cathode flow field plate 130. FIG. 8c corresponds to the lower right portion of the front face 132 of the anode flow field plate 120, the lower left portion of the rear face 134 of the anode flow field plate 120 and the lower left portion of the top of the MEA 600. Seal portions 230 and 232 are included to provide a seal between the anode flow field plate 120 and the MEA 600. In this example, there are no sub-gasket members but rather the MEA 600 is made thicker for providing structural support and protection.

The reactant gas flow 630 is similar to that shown in FIG. 4c. However, in this case, the portion of the reactant gas flow 630 that diffuses across the GDM 122 into region 636 does not react with the catalyst 600a on the MEA 600 since portion 602a of the catalyst 600a has been removed. Accordingly, the reactant gas flow 630 is not disturbed when it initially encounters the MEA 600. This allows the pressure head of the reactant gas flow 630 to normalize in region 636 and hence there is a reduction in eddy flows and turbulence as compared to MEA 124. In addition, since there is no over-reaction, there is not much of a temperature increase in reactant gas in this region of the MEA 600. Accordingly, the reactant gas 630 is more uniformly distributed over the entire area of the catalyst layout 600a and there is an improvement in the efficiency at which the fuel cell operates. Furthermore, the reactant gas flow 630 first encounters an ionomer region of the MEA 600 which does not have any catalyst material which is also structurally more robust than the catalyst layer 600a. This also results in a reduction of the erosion rate of the MEA 600 and increases the structural integrity of the MEA 600.

Figure 9A:
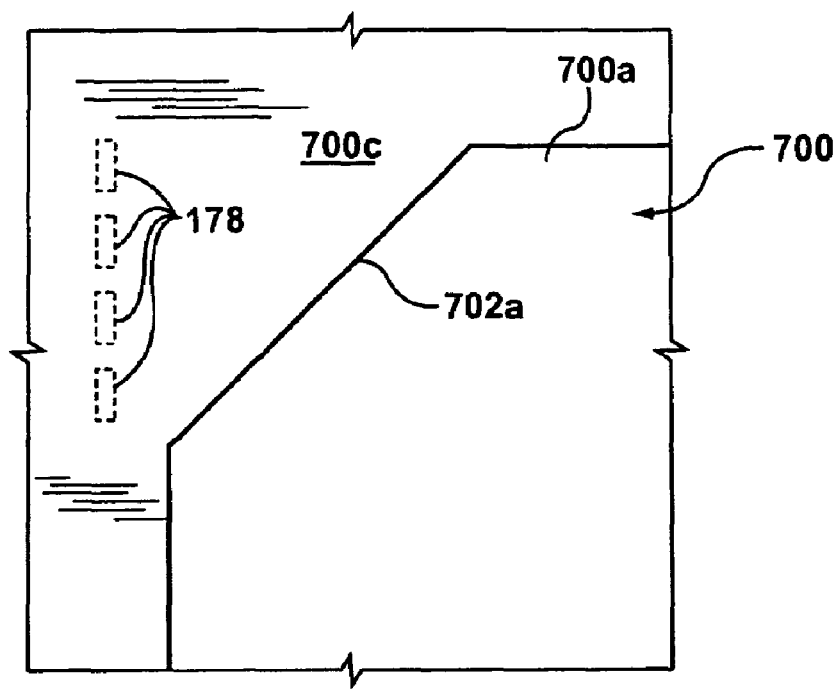
Figure 9B:
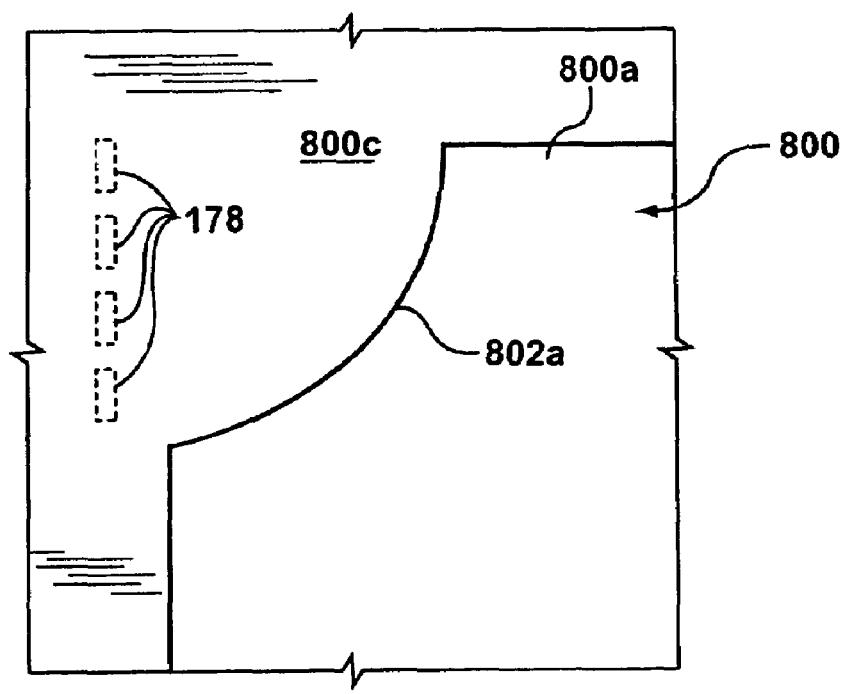

Referring now to FIGS. 9a and 9b, shown therein are enlarged views of alternative shapes for the modified catalyst layout in accordance with the invention. FIG. 9a shows a portion of an MEA 700 in which the spacing between the inlet or outlet aperture and the region of the catalyst layout 700a that is in close proximity to the inlet or outlet aperture of the corresponding flow field plate has been increased by removing a portion of the catalyst layout 700a and leaving an angled edge 702a. FIG. 9b shows a portion of an MEA 800 in which the spacing between the inlet or outlet aperture and the region of the catalyst layout 800a that is in close proximity to the inlet or outlet aperture of the corresponding flow field plate has been increased by removing a portion of the catalyst layout 800*a* and leaving an arced edge 802*a*. The location of the transfer slots 178 of the corresponding flow field plate with respect to the MEAs 700 and 800 is shown in dotted lines for both FIGS. 9*a* and 9*b*. In both of these embodiments, there is an initially larger transition for the initial contact between the catalyst layer and the reactant gas flow as one moves from the upper transfer slot to the lower transfer slot. In general, both of the catalysts layouts 700*a* and 800*a* can be considered to have tapered cutout portions. The rate of tapering may be varied for the same edge of the catalyst layout 700*a* and 800*a*. Further, different types of cutouts may be used in different areas of the catalyst layouts 700*a* and 800*a*. The particular cutout that can be used, as well as the tapering, if any, may be selected depending on the size of the corresponding inlet or outlet aperture or the flow rate of the reactant gas. Alternatively, other shapes can also be used for the cutout portion to ease the transition such as a staircase shape.

From FIGS. 9*a* and 9*b*, it should be noted that for each of the MEAs 300 to 800 of the invention, the catalyst layout is modified such that there is no overlap between the transfer slots 178 and the corresponding catalyst layout. In other words, the transfer slots 178 are a portion of a feed structure that provides reactant gas from an inlet aperture to the inlet distribution channels or receives reactant gas from the outlet collection channels and feeds the reactant gas to an outlet aperture. According to the invention, the transfer slots 178 directly overlie a portion of the MEA without the catalyst layout. Accordingly, a portion of the reactant gas flow from the transfer slots 178 may directly flow to a portion of the MEA, via a GDM, that does not have catalyst material, such as a sub-gasket member or a portion of the ionomer layer of the PEM. This "non-overlap" structure is also true for the transfer slots near the outlet aperture for some of the embodiments.

The amount of increased spacing between the edge of the catalyst layout and a corresponding inlet or outlet aperture may be selected in a number of different ways. For instance, the increased spacing may be selected such that there is no overlap between the catalyst layout and the transfer slots, or some other feed mechanism that introduces reactant gas to the inlet distribution and primary reactant gas flow channels or receives reactant gas from the outlet collection channels. Alternatively, the increased spacing may be selected such that there is no overlap between the catalyst layout and the inlet distribution channels and/or the outlet collection channels. In another alternative, the increased spacing may be selected such that the catalyst layout extends to within approximately 1 mm from the coolant flow field.

It should be understood by those skilled in the art, that the MEAs 300 to 800 of the invention may include sub-gasket members, which in some cases may be an ionomer. It is quite difficult to compress the sub-gasket members. Accordingly, the sub-gasket members may be used to protect the catalyst layers on the MEAs 300 to 800, provide structural support and increased durability as well as possibly providing for extra sealing. For example, the PEM layers 300*c* to 800*c* of the MEAs 300 to 800 may have a thickness of approximately 18-30 microns and there may be sub-gasket members on each side of the PEM layers 300*c* to 800*c* having a thickness of approximately 25 to 30 microns. In this case, the combined thickness is approximately 75-90 microns. In this case, the reactant gas flow may first encounter a sub-gasket member rather than the PEM layer when it diffuses through the GDM in close proximity to the corresponding inlet aperture. In another alternative, the sub-gasket members may be wider than those that are conventionally used or they may have the same width as those that are conventionally used and placed adjacent to the spaced apart region of the catalyst layout. In another alternative, the PEM layers 300*c* to 800*c* may have an increased thickness or with a reinforced structure that is suitable for providing structural support and protection and may not require sub-gasket members. In accordance with the invention, sub-gasket members or an increased thickness in the region of the MEA in the vicinity of the inlet apertures may be used where the flow of the incoming reactant gas is greatest and hence the amount pressure experienced by the MEA is greatest. This improves the structural robustness of the MEA.

It should also be understood by those skilled in the art, that the MEAs 300 to 800 of the invention may further include a plurality of alignment notches (not shown) in order to be used in electrochemical cell stack assembly processes in which alignment bars are used to line up the components of the fuel cell stack 100. The MEAs 300 to 800 of the invention may also have a larger surface area than that of the flow field 120 and 130 plates to prevent electrical shorting of these flow field plates.

It should further be noted that the increased spacing does not have to be the same on both sides of the MEA. For instance, the flow rate of a reactant gas may be higher on one side of the MEA than the other side. Accordingly, the increased spacing may be selected to be larger for the side in which there is a higher flow rate of reactant gas. In addition, for a particular side of the MEA, the increased spacing between the inlet aperture, that delivers reactant gas to this surface of the MEA, and the corresponding adjacent portion of the catalyst layout may be larger than the increased spacing between the outlet aperture, that receives reactant gas from this surface of the MEA, and the corresponding adjacent portion of the catalyst layout.

It should also be noted that the turbulence and temperature effects of reactant gas flow due to the catalyst layout on conventional MEAs described herein is based on conjecture and theory. Further experimentation may be required to determine the exact cause of increased MEA erosion due to the conventional catalyst layouts. However, the inventors have seen improvements in fuel cell operation and increased MEA lifetime when testing fuel cells that have an MEA with an altered catalyst layout according to one of the embodiments shown herein.

It should also be understood that the invention has been described for a fuel cell. However, the invention is applicable to other electrochemical cells which utilize a similar structure such as electrolyzers. In this case, reactant gases are not used in operation but reactant fluids, i.e. hydrogen containing fluids are used. Accordingly, the term reactant fluid may be used and understood to cover hydrogen containing fluids such as those used in electrolyzers as well as reactant gases such as those used in fuel cells. Likewise the terms reactant fluid flow, inlet distribution reactant fluid flow channels and outlet collection reactant fluid flow channels may be used instead of reactant gas flow, inlet distribution reactant gas flow channels and outlet collection reactant gas flow channels, respectively. In addition, it should be understood that apertures are not required for the MEA since the MEA may be large enough to fit in between the first and second sets of apertures on the flow field plates.

While the invention is described in relation to a proton exchange membrane (PEM) fuel cell, it should be understood that the invention has general applicability to any type of fuel or electrochemical cell which utilizes an MEA. Thus, the invention could be applied to fuel cells with alkali electrolytes, fuel cells with phosphoric acid electrolyte, high temperature fuel cells, e.g. fuel cells with a membrane similar to a proton exchange membrane but adapted to operate at around 200° C., electrolyzers, and regenerative fuel cells. In addition, the invention may be applied to direct methanol fuel cells and micro fuel cells. Furthermore, the inventive MEA of the invention may not include apertures. Rather, the MEA may be a rectangular sheet, or a sheet having another appropriate shape, that is disposed in between the apertures of the electrochemical cell. Furthermore, the increased amount of spacing may be different depending on the reactant fluid is flowing close to that region of the catalyst layout. For instance, in embodiments where there is increased spacing near the input and output apertures, the amount of increased spacing may be depending on whether the catalyst layout is facing an anode flow field plate or a cathode flow field plate. In addition, the spacing may be different depending on whether the catalyst layout is adjacent to an inlet or outlet aperture. The invention can also be applied to electrochemical cell assemblies that use gaskets or a seal-in place process to provide sealing. The invention can also be applied to electrochemical cells that use bipolar flow field plates that provide both an anode and a cathode. Further, it should be understood by those skilled in the art, that various modifications can be made to the embodiments described and illustrated herein, without departing from the invention, the scope of which is defined in the appended claims.

The invention claimed is:

1. An electrochemical cell assembly comprising:
   a) first and second flow field plates each including an active surface facing one another, and each having first and second sets of apertures for reactant fluid flow and optionally coolant flow, each set of apertures including an inlet aperture and an outlet aperture, the plates further including a feed structure for enabling reactant fluid flow from one of the inlet apertures along the active surface to one of the outlet apertures;
   b) first and second gas diffusion media disposed between the first and second flow field plates; and,
   c) a membrane electrode assembly, disposed between the first and second gas diffusion media, including:
      i) a proton exchange membrane; and,
      ii) a catalyst layer on each surface of the proton exchange membrane having a catalyst layout being generally disposed in between the first and second sets of apertures, wherein, for at least one surface of the membrane electrode assembly, the catalyst layout is configured to omit the catalyst from a portion of the proton exchange membrane adjacent an edge region of one of the first and second gas diffusion media, thereby enabling at least a portion of the reactant fluid flow to first encounter a region of the membrane electrode assembly without the catalyst, wherein the spacings between both of the inlet and outlet apertures that are involved with the reactant fluid flow that is provided to the catalyst layer and at least one portion of edges of the catalyst layout that are adjacent and nearest to the inlet and outlet apertures that are involved with reactant fluid flow are such that the catalyst layout omits the catalyst from a portion of the proton exchange membrane adjacent an edge region of one of the first and second gas diffusion media, thereby enabling at least a portion of the reactant fluid flow to first encounter a region of the membrane electrode assembly without the catalyst.

2. The electrochemical cell assembly of claim 1, wherein the feed structure comprises at least one transfer slot associated with the one of the apertures, the arrangement being such that at least a portion of the at least one transfer slot does not overlap the catalyst layout.

3. The electrochemical cell assembly of claim 1, wherein the one of the apertures is the inlet aperture and the feed structure comprises inlet distribution reactant fluid flow channels associated with the inlet aperture, the arrangement being such that at least a portion of the inlet distribution reactant fluid flow channels do not overlap the catalyst layout.

4. The electrochemical cell assembly of claim 1, wherein the one of the apertures is the outlet aperture and the feed structure comprises outlet collection reactant fluid flow channels associated with the outlet aperture, the arrangement being such that at least a portion of the outlet collection reactant fluid flow channels do not overlap the catalyst layout.

5. The electrochemical cell assembly of claim 1, wherein one of the flow field plates includes a coolant flow field on a rear side thereof, and the surface area of the catalyst layout is substantially similar to or slightly larger than the surface area of the coolant flow field.

6. The electrochemical cell assembly of claim 1, wherein the catalyst layout includes a notch for providing said at least one portion of the proton exchange membrane, the notch having a vertical extent that is similar to or larger than the vertical extent of the one of the apertures.

7. The electrochemical cell assembly of claim 6, wherein the notch has a tapered edge.

8. The electrochemical cell assembly of claim 7, wherein the tapered edge is straight.

9. The electrochemical cell assembly of claim 7, wherein the tapered edge is curved.

10. The electrochemical cell assembly of claim 1, wherein said at least one portion of the portion exchange membrane is provided along substantially the entire side of the catalyst layout that is adjacent to the one of the apertures.

11. A membrane electrode assembly for use in an electrochemical cell assembly comprising:
   a) a proton exchange membrane; and,
   b) catalyst layer on each surface of the proton exchange membrane having a catalyst layout being generally disposed in between first and second apertures of the electrochemical cell assembly including an inlet aperture and an outlet aperture, the catalyst layout is configured to omit the catalyst from a portion of the portion exchange membrane adjacent an edge region of one of the first and second gas diffusion media, thereby enabling at least a portion of reactant fluid flow from the one of the apertures of the electrochemical cell assembly to first encounter a region of the membrane electrode assembly without the catalyst, wherein the spacings between both the first and second apertures and at least one portion of edges of the catalyst layout adjacent and nearest to the first and second apertures are such that the catalyst layout omits the catalyst from a portion of the proton exchange membrane adjacent an edge region of one of the first and second gas diffusion media, thereby enabling at least a portion of the reactant fluid flow to first encounter a region of the membrane electrode assembly without the catalyst.

12. The membrane electrode assembly of claim 11, wherein said at least one portion of the proton exchange membrane is provided along substantially the entire side of the catalyst layout that is adjacent to the one of the apertures.

13. The membrane electrode assembly of claim 11, wherein the electrochemical cell assembly includes at least one transfer slot associated with the one of the apertures, the arrangement being such that at least a portion of the at least one transfer slot does not overlap the catalyst layout when the electrochemical cell assembly is assembled.

14. The membrane electrode assembly of claim 11, wherein the one of the apertures is an inlet aperture and the electrochemical cell assembly includes inlet distribution reactant fluid flow channels associated with the inlet aperture, arrangement being such that at least a portion of the inlet distribution reactant fluid flow channels do not overlap the corresponding catalyst layout when the electrochemical cell assembly is assembled.

15. The membrane electrode assembly of claim 11, wherein the one of the apertures is an outlet aperture and the electrochemical cell assembly includes outlet collection reactant fluid flow channels associated with the outlet aperture, the arrangement being such that at least a portion of the outlet collection reactant fluid flow channels do not overlap the catalyst layout when the electrochemical cell assembly is assembled.

16. The membrane electrode assembly of claim 11, wherein the electrochemical cell assembly includes a flow field plate with a coolant flow field on a rear side thereof, and the surface area of the catalyst layout is substantially similar to or slightly larger than the surface area of the coolant flow field.

* * * * *